(12) United States Patent
Mansson et al.

(10) Patent No.: US 12,167,797 B2
(45) Date of Patent: Dec. 17, 2024

(54) SEAT CLIP AND CHAIR

(71) Applicant: IKEA SUPPLY AG, Pratteln (CH)

(72) Inventors: Peter Mansson, Killeberg (SE); Thomas Holma, Svangsta (SE)

(73) Assignee: IKEA SUPPLY AG, Pratteln (CH)

( * ) Notice: Subject to any disclaimer, the term of this patent is extended or adjusted under 35 U.S.C. 154(b) by 642 days.

(21) Appl. No.: 17/281,642

(22) PCT Filed: Sep. 27, 2019

(86) PCT No.: PCT/SE2019/050926
§ 371 (c)(1),
(2) Date: Mar. 31, 2021

(87) PCT Pub. No.: WO2020/071983
PCT Pub. Date: Apr. 9, 2020

(65) Prior Publication Data
US 2021/0386203 A1    Dec. 16, 2021

(30) Foreign Application Priority Data
Oct. 1, 2018 (SE) .................................... 1851178-2

(51) Int. Cl.
*A47C 4/02* (2006.01)
*F16B 2/22* (2006.01)

(52) U.S. Cl.
CPC . *A47C 4/02* (2013.01); *F16B 2/22* (2013.01)

(58) Field of Classification Search
CPC ............ A47C 4/02; A47C 13/005; F16B 2/22
See application file for complete search history.

(56) References Cited

U.S. PATENT DOCUMENTS

| 2,358,607 | A | | 9/1944 | Tinnerman |
| 2,996,770 | A | * | 8/1961 | Norman ............... A47C 13/005 |
| | | | | 52/717.03 |
| 3,711,140 | A | * | 1/1973 | Onori ................... E05C 19/063 |
| | | | | 292/87 |
| 6,378,918 | B1 | | 4/2002 | Mita et al. |

(Continued)

FOREIGN PATENT DOCUMENTS

| AU | 2010100692 A4 | 8/2010 | |
| CA | 3147144 A1 * | 8/2022 | ............... A47C 4/02 |

(Continued)

OTHER PUBLICATIONS

Chinese Office Action for CN Application No. 201980064901 mailed Jun. 29, 2022 (13 pages, with English translation).

(Continued)

*Primary Examiner* — Timothy J Brindley
(74) *Attorney, Agent, or Firm* — Merchant & Gould P.C.

(57) ABSTRACT

The invention provides a seat clip (1) for attaching a seat to a frame of a chair, comprising an upper portion (2) arranged to be attached to the seat (6), a lower portion (3) comprising a latching element (5) arranged to be reversibly attached to the frame (7) by positive locking, and an intermediate portion (4) connecting the upper portion (2) to the lower portion (3) and being flexible, such that the seat clip can be deformed when pressure is applied to the intermediate portion (4) and/or the lower portion (3) in order to attach the latching element (5) to the frame (7).

15 Claims, 6 Drawing Sheets

(56) References Cited

U.S. PATENT DOCUMENTS

| | | | |
|---|---|---|---|
| D703,368 S | * | 4/2014 | Oldani .......................... D26/113 |
| 8,832,939 B2 | | 9/2014 | Wilson et al. |
| 2011/0272953 A1 | | 11/2011 | Mercier et al. |
| 2012/0038198 A1 | | 2/2012 | Feltrin |
| 2018/0338623 A1 | * | 11/2018 | Winterhalter ...... A47G 23/0225 |

FOREIGN PATENT DOCUMENTS

| | | | | |
|---|---|---|---|---|
| CN | 102781283 A | | 11/2012 | |
| CN | 105534105 B | * | 12/2018 | ............... A47C 4/02 |
| DE | 202005005671 U1 | * | 8/2005 | ............. A47C 17/86 |
| DE | 102011016179 A1 | | 10/2012 | |
| WO | 2011112183 A1 | | 9/2011 | |
| WO | 2017/123177 A1 | | 7/2017 | |
| WO | 2018000021 A1 | | 1/2018 | |

OTHER PUBLICATIONS

International Search Report for International Application No. PCT/SE2019/050926 mailed Oct. 14, 2019 (4 pages).
European Search Report for EP Application No. 19868729.5 mailed May 23, 2022 (7 pages).

* cited by examiner

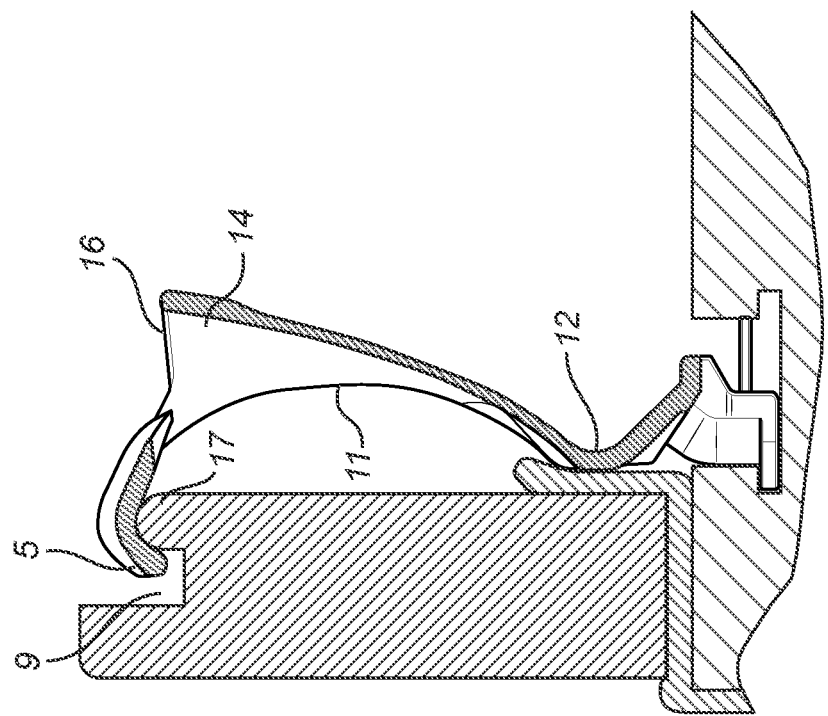
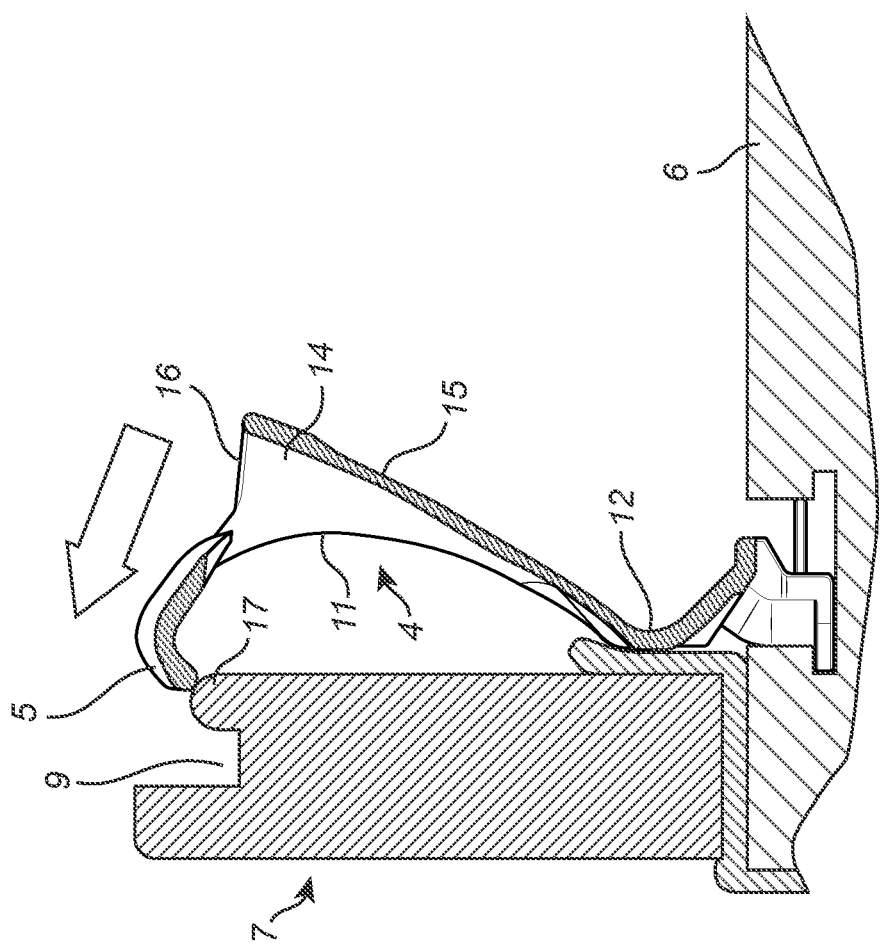

SEAT CLIP AND CHAIR

This application is a National Stage Application of PCT/SE2019/050926, filed 27 Sep. 2019, which claims benefit of Serial No. 1851178-2, filed 1 Oct. 2018 in Sweden, and which applications are incorporated herein by reference. To the extent appropriate, a claim of priority is made to each of the above disclosed applications.

FIELD OF THE INVENTION

The invention relates to an element for connecting a seat of a chair to a frame of the chair.

BACKGROUND

Articles of furniture, such as chairs, are often sold as separate parts in a disassembled state. In the case of a chair, for example, the frame comprising the legs and back support may be packaged and even sold separately from the seat. This has several advantages: First, it makes the chair easier to transport. It also gives customers the freedom to combine different types of frames with different types of seats. For example, one frame might be combined with a seat that has a material covering or an upholstery on its seat surface, or with a seat that has a plain, uncovered seat surface.

As such, the seat and the frame of the chair are usually assembled by the customer at home. Typically, the seat is fixed to the frame by a right-angled bracket made from metal or plastic, where one leg of the bracket is affixed, usually screwed, to the underside of the seat, and the other leg is fixed to the inner side of the frame. The brackets and the screws are normally packaged in small plastic bags and included in the package for the frame or the seat.

This method has several drawbacks: It is inconvenient, since it requires the use of screws and a screwdriver or a similar tool for assembly. Depending on the size of the bracket, a screw that is to be screwed into the seat might be situated very close to the frame. It may even be so close that the frame may prevent the user from fully rotating the screwdriver unless they hold it at an angle, making the procedure even more inconvenient. It can also happen that the bracket is slightly twisted or rotated due to the screwing motion when its first leg is attached to the first part of the chair, i.e., the seat of the frame. This can make the task of aligning the bracket and the respective second part difficult.

Further, the customer might wish to disassemble the chair, for example because they wish to transport the chair, change the upholstery of the seat, or change the seat itself. In this case, they have to unfasten and remove the screws. Depending on the material of the chair, the threads in the frame and the seat may be damaged easily, such that the screws cannot easily be fastened again after they have been removed once.

Further still, normally at least four brackets are used to fix the seat of the chair to the frame, and as such, at least eight screws are required. However, such screws are often small, inconvenient to handle, and easily lost. Moreover, each bracket and its corresponding screws are sometimes put into one bag, which can result in a considerable amount of waste material.

In light of this, the object of the invention is to provide an improved element for connecting a seat and a frame of a chair.

SUMMARY OF THE INVENTION

This object is achieved with a seat clip according to claim 1. Preferred embodiments are specified in the dependent claims.

According to the invention, the seat clip comprises an upper portion arranged to be attached to the seat of a chair, a lower portion comprising a latching element arranged to be reversibly attached to the frame of the chair by positive locking, and an intermediate portion connecting the upper portion to the lower portion and being flexible, such that seat clip can be deformed when pressure is applied to the intermediate portion and/or the lower portion in order to attach the latching element to the frame.

Here, the terms "upper" and "lower" refer to the orientation of a seat clip when it is attached to a chair and the chair is in an upright position with its feet resting on the ground. In the following, the principle direction of extension of the seat clip, i.e., the direction "lower portion—intermediate portion—upper portion" will be referred to as the longitudinal direction.

When two elements are connected by positive locking, they are interlocked such that one element obstructs the movement of the other element. In other words, one element "is in the way" of the other element.

The flexible intermediate portion may allow the seat clip to be deformed, in particular bent, in a direction that is perpendicular to the longitudinal direction. This way, when the seat clip is attached to the seat via its upper portion, it can be deformed in a direction parallel to the surface of the seat. In other words, the lower portion of the seat clip is movable towards the frame or away from the frame even when the upper portion is fixed to the seat.

The intermediate portion may be flexible because it comprises a flexible material. Such a flexible material may be, for example, an elastomer. Additionally or alternatively, the intermediate portion may have a shape that inherently provides flexibility. It may, for example, comprise one or more curved or wave-like portions.

The seat clip can then be fixed to the frame simply by pushing the seat clip towards the frame, until the latching element interlocks and forms a positive lock with a corresponding part of the frame. For example, the latching element can interlock with a groove or a hole provided in the frame. In other words, in contrast to the background art described above, the seat clip according to the invention provides a simple "snap-in" interlocking of the seat clip and the frame. This removes, at least for the connection to the frame, the need for screws, nails, or similar elements and respective tools. Advantageously, the latching is perceptible by the user, for example by a clicking sound or by sensing a feedback with their finger. Compared to the background art, such an interlock is fast, easy, and convenient. Further, since no screws are required for this connection, less individual parts are needed in total, cutting down on material and packaging costs.

The latching element may comprise a first curved portion. The curved portion may comprise a bulge or nose-like element. Such a latching element may advantageously form a positive lock with a groove in the frame. For example, to fix the lower portion to the frame, a user may force such a curved latching element over an edge of the groove, and the latching element, particularly the bulge or nose, may then interlock with this edge.

The intermediate portion may comprise a second curved portion, which is curved in the same direction as the first curved portion. The intermediate portion may comprise a third curved portion, which is curved in a direction opposite to that of the second curved portion. The third curved portion may comprise the part of the seat clip that connects the intermediate portion to the upper portion. In other words, the profile of the seat clip may be partially sinuous or S-shaped when viewed from a side direction. The radius of curvature and/or the length of the first curved portion may be different from those of the second curved portion and/or the third curved portion. The radius of curvature and/or the length of the second curved portion may be different from those of the third curved portion. In particular, the radius of curvature of the second curved portion may be larger than that of the first curved portion and/or the third curved portion. By forming the seat clip to comprise at least two curved portions that are curved in opposite directions, the seat clip inherently takes on the properties of a spring. When connected to the seat and the frame, the seat clip is put under tension, which provides improved stability to the connection.

The upper portion may comprise at least one protrusion arranged to be inserted into at least one corresponding opening in the underside of the seat to establish a positive locking between the seat clip and the seat. For example, the at least one protrusion may comprise projections that are designed to positively lock with corresponding features of the opening, such as grooves or notches. This way, no tools are needed in order to attach the seat clip to the seat, and the entire chair can be assembled by connecting the chair to the seat without tools, screws, nails, or similar elements. Alternatively or additionally, non-positive locking may be used to fix the upper portion to the seat, particularly the at least one protrusion inside the corresponding opening.

In a further modification, at least two protrusions may be provided having different outer shapes and/or dimensions. For example, the upper portion could comprise two cylindrical protrusions. The first protrusion could have an outer diameter of, e.g., 15 mm, whereas the second protrusion could have an outer diameter of, e.g. 10 mm. The seat could have two circular holes with corresponding diameters in its underside. Since the first protrusion obviously would not fit into the hole corresponding to the second protrusion, there is only one possible way to attach the seat clip to the seat. Alternatively, the first protrusion might have a rectangular outer shape, whereas the second protrusion might be cylindrical. Then, the corresponding holes in the seat may have rectangular and circular shapes, respectively. Alternatively or additionally, the first protrusion and the second protrusion might have different lengths. In this case, the holes in the seat may have different depths. By providing two protrusions with different outer shapes and/or dimensions, there is only one possible orientation for the seat clip when it is attached to the seat, and misalignment of the seat clip can be avoided.

The at least one protrusion may comprise a flexible tongue-like element extending laterally from the at least one protrusion. Such a protrusion has several advantages: Since it can be deformed, in particular bent, it makes insertion of the at least one protrusion into the corresponding opening easier. For example, if the at least one protrusion is inserted at a slight angle into the opening, it might, without the tongue-like protrusion, wedge and jam inside the opening. In contrast, the tongue-like element would, in such a case, bend and allow further insertion.

Further, a flexible tongue-like element can provide a non-positive lock when the at least one protrusion has been inserted into the hole. The non-positive lock can be due to, e.g., friction. Alternatively or additionally, it can be due to deformation of the tongue-like protrusion. For example, the at least one protrusion might be too large for its corresponding hole in a state where the tongue-like element is not deformed. In such a case, when inserting the at least one protrusion into its corresponding hole, the tongue-like element would be bent "upwards", i.e., towards the opening of the hole. In order to remove the seat clip, it would then be necessary to overcome the friction between the at least one protrusion and the walls of the hole, as well as to bend the tongue-like element "downwards", i.e., towards the bottom of the hole, requiring additional force.

The intermediate portion may further comprise a grip arranged for pressing the clip towards the seat and/or frame when attaching the seat clip to the seat and/or frame, and for pulling the seat clip away from the seat and/or the frame when detaching the seat clip from the seat and/or the frame. Such a grip may facilitate attachment and/or detachment of the seat clip to the seat and/or the frame. The portion may by wedge-shaped. In particular, the portion may be a formed as a bulge in the intermediate portion projecting away from the latching element, and tapering along the direction from the lower portion of the seat clip to the upper portion of the seat clip. The grip may have at least one outer surface that allows a user to apply pressure to the grip with a finger, in particular a thumb. The at least one outer surface may comprise ridges to prevent slipping of a finger. The grip may comprise an opening. The opening may be designed such that a cylindrical element or a finger, in particular a thumb, may be inserted into the grip. Thus, increased leverage can be provided when detaching the seat clip from the frame by inserting the cylindrical element or the finger into the opening and pulling in the direction opposite to the frame. The opening may further be designed such that its entrance provides support so that a finger, in particular a thumb, can exert pressure on the grip in the longitudinal direction.

The seat clip may be integrally formed. This makes it easy to package one or more seat clips into one pack or bag, without the user having to sort individual pieces of the seat clips. This can reduce the amount of garbage produced.

The seat clip may be made from a flexible material, in particular a plastic, in particular polyoxymethylene, POM. This further increases the ease of attaching the seat clip to the seat and the frame. Further, such materials are readily available and easy to process.

The seat clip may be formed by injection molding.

The invention further provides a chair, comprising a seat, a frame, and at least one seat clip, wherein the at least one seat clip is attached via an upper portion of the seat clip to the seat, and wherein the at least one seat clip is attached via a lower portion of the seat clip to the frame by positive locking.

The seat clip can have one or more of the above-defined features.

The seat may comprise at least one opening, and the upper portion of the at least one seat clip may comprise at least one protrusion. The at least one seat clip may be attached to the seat by positive lock by inserting the at least one protrusion into the at least one opening. The openings may be provided in the underside of the seat. They may also be provided in a side wall of the seat. Additionally or alternatively, the seat clip may be attached to the seat by non-positive lock.

The at least one opening may a through-hole or a blind hole. A through-hole is advantageous for chairs where the seat comprises a material cover or an upholstery, since the through-hole is easy to manufacture, and the holes are then covered with the material or upholstery, such that they cannot be seen. A blind hole is advantageous for cases where the seat does not comprise a material cover or upholstery.

The at least one opening may comprise at least one notch or groove along its inner side wall, and the at least one protrusion may be formed such that it establishes a positive lock with the at least one notch or groove when the upper portion of the seat clip is inserted into the at least one opening. For example, the at least one protrusion may comprise a nose-like projection that can be interlocked with the groove or notch. This provides a further positive lock for the seat clip with the seat.

The seat clip may be under tension when it is attached to the frame and the seat. The tension may be due to a deformation of the seat clip in an attached state compared to a detached state. In particular, the tension may be due to a deformation of a curved portion of the seat clip. The tension may result in a force pressing the latching element against the groove or notch.

The frame may comprise a groove, and the at least one seat clip may be attached to the frame by interlocking the latching element with the groove, in particular with an inner wall of the groove.

The invention further provides a method of assembling a chair, which comprises attaching at least one seat clip via an upper portion of the seat clip to the seat of a chair, arranging the frame and the seat of the chair into their predetermined relative positions, applying pressure to an intermediate and/or lower part of the at least one seat clip such that a latching element engages with the frame to provide positive locking.

The chair can have one or more of the above-defined features. The seat clip can have one or more of the above-defined features.

Advantageous embodiments will now be described in combination with the enclosed figures.

BRIEF DESCRIPTION OF THE DRAWINGS

FIGS. 5a and 5b schematically show how an exemplary seat clip is attached to a frame in a cut view.

DETAILED DESCRIPTION OF THE INVENTION

Figure 1A:
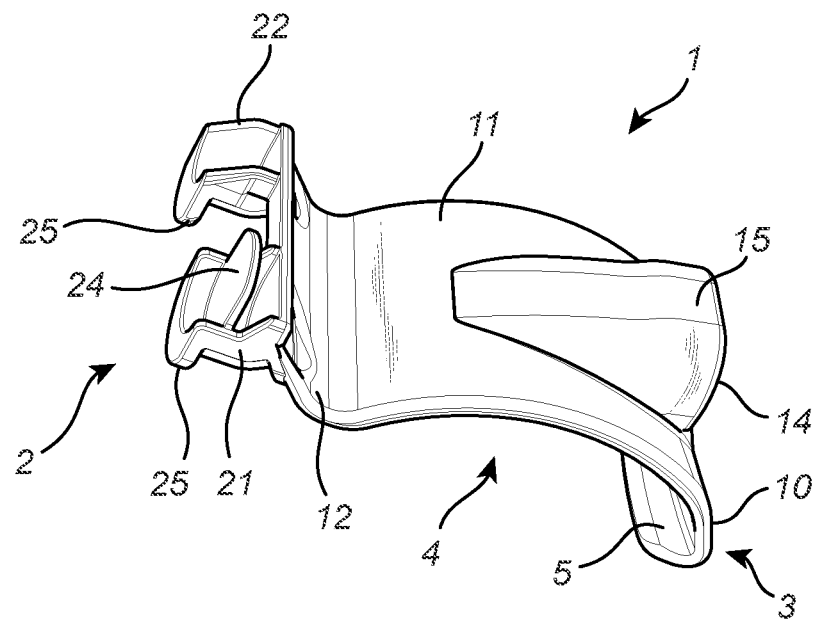
FIGS. 1a and 1b schematically show two perspective views of an exemplary seat clip.
Figure 1B:
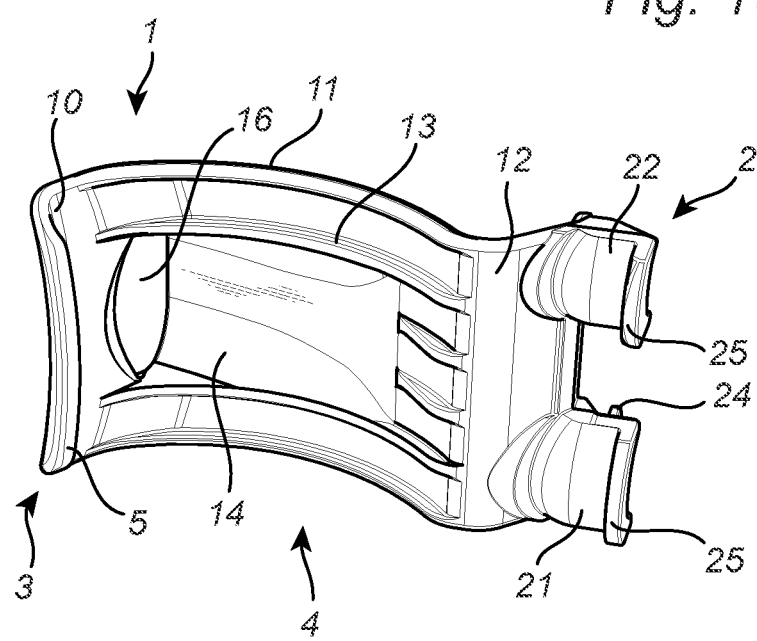

FIGS. 1a and 1b schematically show a seat clip 1 according to an embodiment of the invention. In the following, the side shown in FIG. 1a will be referred to as the "back side" of the seat clip 1 and the side shown in FIG. 1b will be referred to as the "front side" of the seat clip 1. Accordingly, in the following, the directions "front" and "back" refer to these sides.

It can be seen that the seat clip 1 comprises an upper portion 2, a lower portion 3 and an intermediate portion 4, which connects the upper portion 2 and the lower portion 3.

The upper portion comprises two protrusions 21 and 22. Each of the two protrusions 21 and 22 comprises a projection 25 at its end. In the illustrated embodiment, the protrusions 21 and 22 have a foot-like shape. The protrusion 21 further comprises a flexible tongue-like element 24 extending from the back of the protrusion 21. The protrusions 21 and 22 may have different outer sizes. For example, the diameter of the circular portion of the projection 25 belonging to the protrusion 21, may be 15 mm, and the diameter of the circular portion of the projection 25 belonging to the protrusion 22 may be 10 mm.

The lower portion 3 comprises a latching element 5, which comprises a curved portion 10. In the illustrated embodiment, the latching element 5 has a hook-like shape.

It can be seen that the intermediate portion 4 comprises a curved portion 11 of the seat clip 1, which is curved in the same direction as the curved portion 10 of the latching element, but with a larger radius of curvature. The intermediate portion 4 further comprises a curved portion 12, which is curved in the opposite direction as the curved portion 10. It can be seen that the radius of curvature of the curved portion 11 is larger than the radius of curvature of the curved portion 10 and the curved portion 12. In other words, the seat clip 1 has a sinuous, roughly S-shaped form. This shape inherently gives the seat clip 1 elastic, spring-like properties. In particular, it allows the seat clip 1 to be bent in a direction that is perpendicular to the longitudinal direction. It also provides compressibility in the longitudinal direction. For structural support, the intermediate portion 4 comprises ridges 13 along the inner side of the curved portion 11.

The intermediate portion 4 further comprises a grip 14. It can be seen that the grip 14 is formed as a wedge-like bulge of the intermediate portion 3, extending from the back side of the seat clip 1. The grip 14 tapers along the longitudinal direction from the lower portion 3 to the upper portion 2 of the seat clip 1. It can be seen that the back side of the grip 14 comprises a part 15 that is substantially flat, i.e., it is not or only slightly curved. The substantially flat part 15 is large enough so that a user can comfortably exert pressure on it with a finger, preferably a thumb. The grip 14 further comprises an opening 16. The opening 16 is large enough to insert a finger, preferably a thumb, into the grip 14 in order to pull it in a backward direction. Additionally, the opening 16 is dimensioned such as to provide support for a finger, preferably a thumb, to exert pressure along the longitudinal direction.

Figure 2:
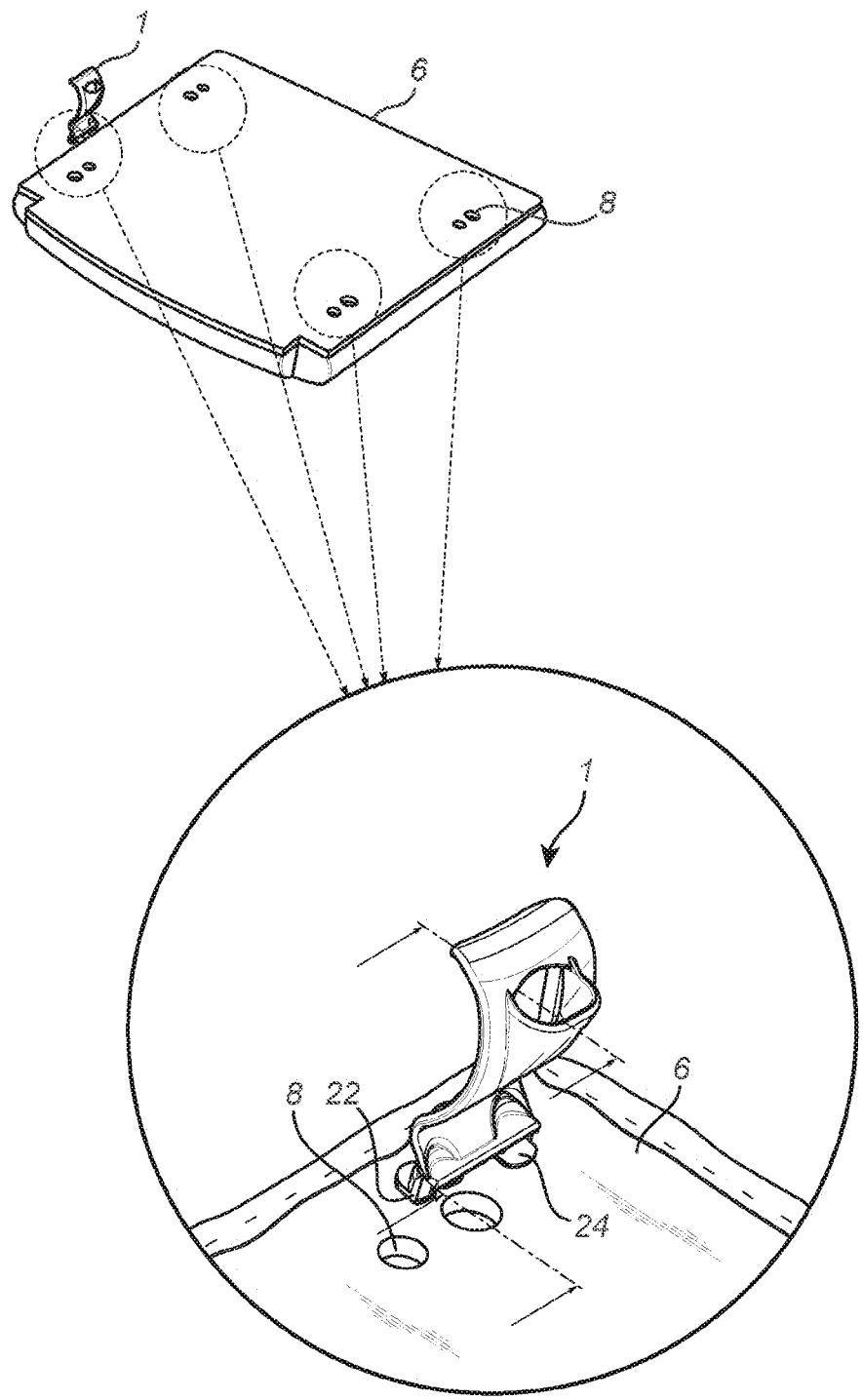
FIG. 2 schematically shows a seat clip and a seat.

FIG. 2 shows a seat clip 1 and a seat 6 of a chair in a configuration before the seat clip 1 is attached to the seat 6. The seat clip 1 may correspond to the seat clip illustrated in FIGS. 1a and 1b. The seat 6 comprises four pairs of two openings 8 each, where each pair is used for fixing one seat clip to the seat. In particular, the openings 8 are provided in the underside of the seat 6. It can be seen in the enlarged part of FIG. 2 that the openings 8 have slightly different diameters. These diameters may correspond to the different sizes of the protrusions 21 and 22 as described with reference to FIGS. 1a and 1b. Through the different sizes of the openings 8, the orientation of the seat clip 1 with respect to the seat 6 is determined. It can be seen that in the illustrated embodiment, the front side of the seat clip 1 faces the edge of the seat 6.

Figure 3A:
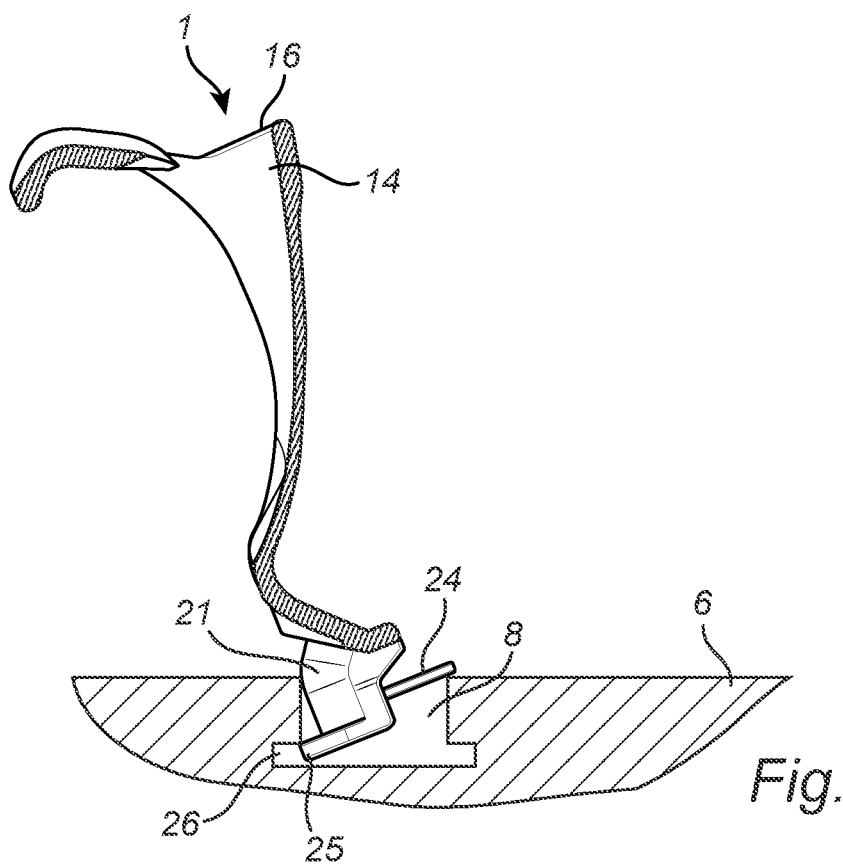
FIGS. 3a to 3c schematically show how an exemplary seat clip is attached to a seat in a cut view.
Figure 3B:
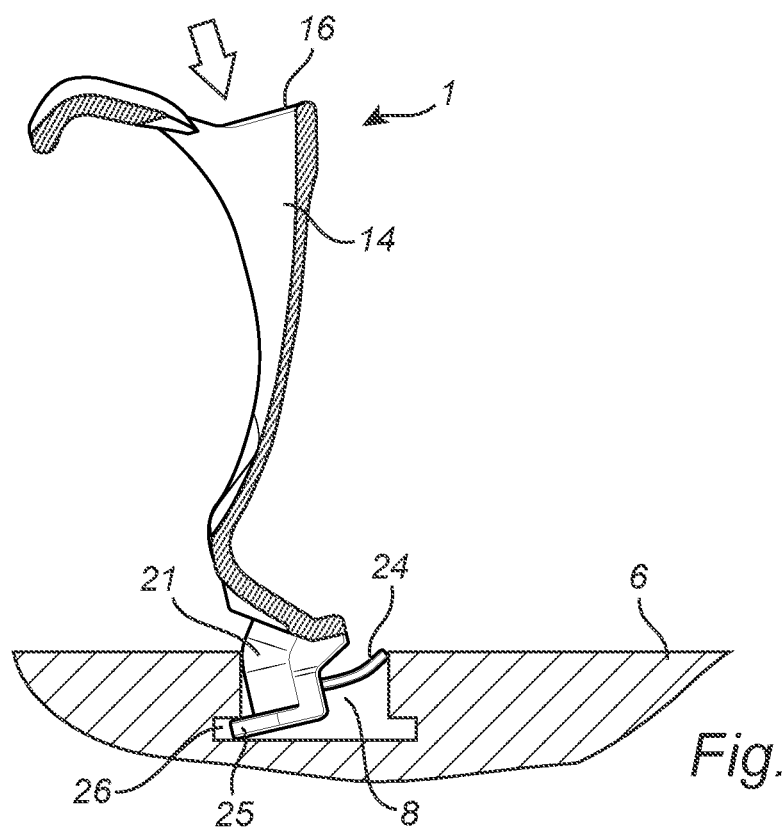
Figure 3C:
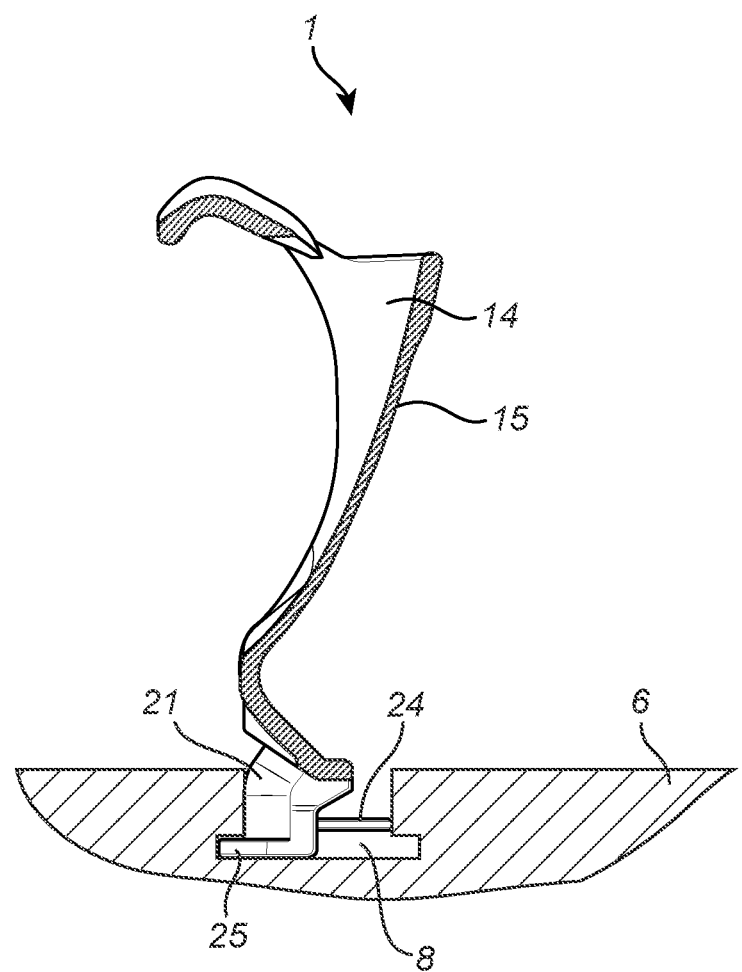

FIGS. 3a to 3c schematically show how a seat clip 1 is attached to a seat 6 in a cut view. The seat clip 1 may correspond to the seat clip illustrated in FIGS. 1a and 1b. The seat may correspond to the seat illustrated in FIG. 2. In the cut view, it can be seen that the opening 8 comprises a notch or groove 26 along its inner wall. In a first step, the protrusion 21 is inserted into the opening 8 at an angle. FIG. 3a shows that this is done such that the front part of the projection 25 rests at the entrance of the notch or groove 26. The flexible tongue-like element 24 rests on the upper edge of the opening 8 at this point.

Then, as illustrated in FIG. 3b, pressure is exerted on the grip 14 in direction of the indicated arrow. Preferably, this pressure is applied by pushing with a finger, preferably a thumb, onto the opening 16 of the grip 14. This pressure forces the back part of the protrusion 21 into the opening, which is accompanied by a deformation of the tongue-like element 24. At the same time, the protrusion 21 pivots around a transversal axis, which is normal to the plane of projection in FIGS. 3a to 3c. Thus, the projection 25 is inserted into the notch or groove 26.

FIG. 3c illustrates the situation when the protrusion 21 is fully inserted into the opening 8. It can be seen that the projection 25 forms an interlock with the notch or groove 26. In the illustrated embodiment, the tongue-like element 24 has returned to its non-deformed state. In this embodiment, the tongue-like element 24 abuts the inner wall of the opening 8. In alternative embodiments, the tongue-like element 24 could be in a deformed state even when the protrusion 21 is fully inserted into the opening 8. It is also possible that the tongue-like element 24 slots into a further groove or notch provided along the inner wall of the opening 8 when the protrusion 21 is fully inserted into the opening 8.

It is possible to detach the seat clip 1 from the seat 6 starting from the configuration shown in FIG. 3c by applying pressure to the part 15 of the grip 14. The pressure is preferably applied with a finger, preferably a thumb. The part 15 may correspond to the substantially flat part 15 shown in FIG. 1a. The pressure is exerted opposite to the direction indicated by the arrow in FIG. 3b. This pressure will cause the seat clip 1 to pivot in forward direction, pulling the tongue-like element 24 out of the opening 8. At the same time, the projection 25 will be removed from the notch or groove 26. Once the projection 25 is clear of the notch or groove 26, the seat clip 1 can be pulled free of the opening 8.

Figure 4:
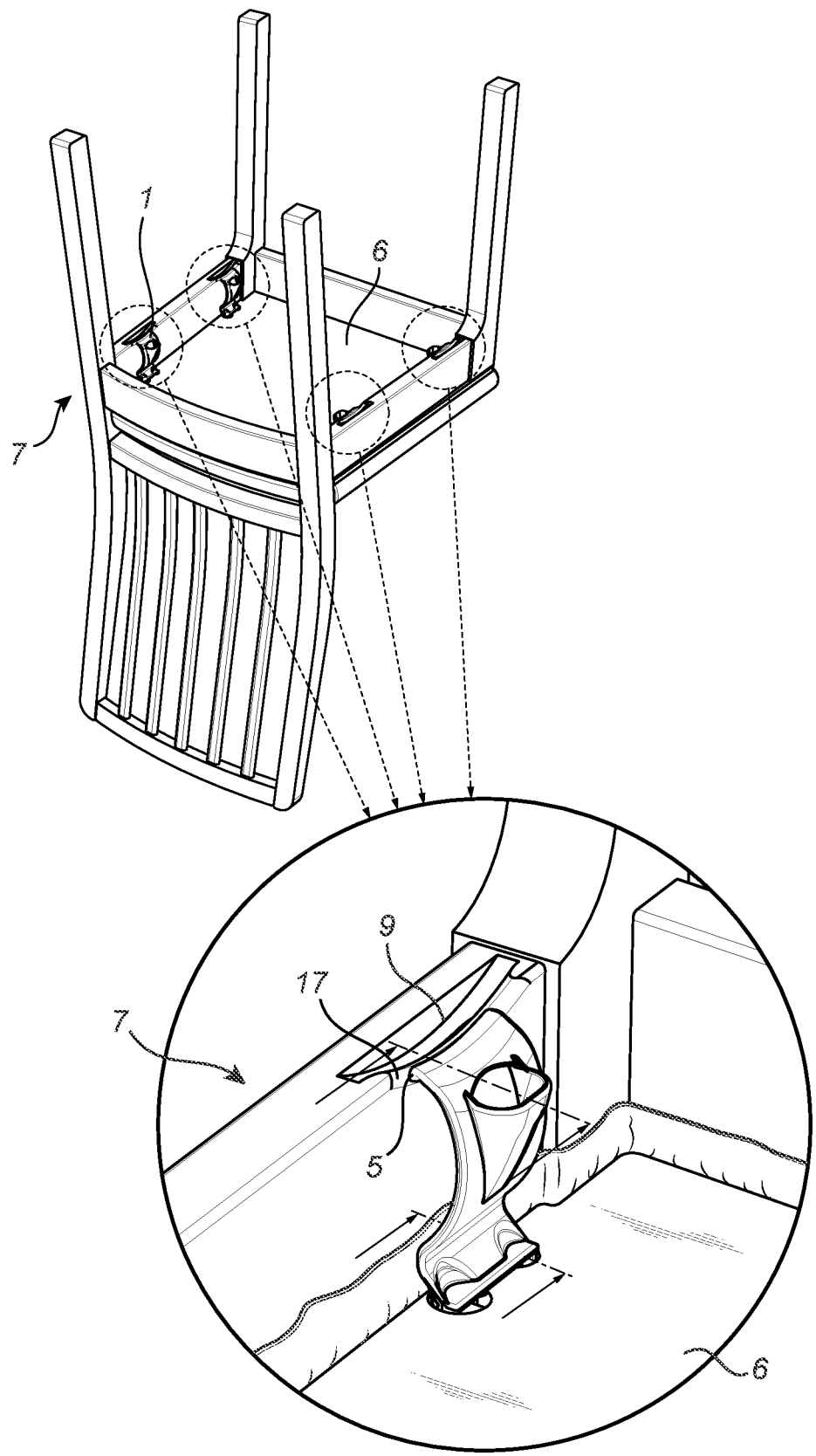
FIG. 4 schematically shows an exemplary chair.

FIG. 4 shows a chair according to an embodiment of the invention in a configuration where four seat clips 1 are attached to the seat 6. The seat clips 1 are not yet connected to the frame 7 of the chair. The frame 7, comprising the legs and back support of the chair, and the seat 6 have been moved into their predetermined relative positions. In other words, the seat 6 and the frame 7 have been assembled to form the chair, but are not yet fixed to one another. The seat clips 1 may correspond to the seat clip 1 illustrated in FIGS. 1a and 1b.

It can be seen in the enlarged portion of FIG. 4 that the frame 7 comprises, for each seat clip 1, a groove 9. In particular, the groove 9 is formed in the side boards that connect the legs and the back of the frame. In the illustrated embodiment, the wall 17 of the groove 9 which faces the seat clip 1 has a curved profile. Such a profile advantageously allows the latching element 5 of seat clip 1 to interlock with the groove 9, as will be illustrated with reference to FIGS. 5a and 5b. However, the groove 9 and the wall 17 may have other shapes that provide an analogous positive lock between the seat clip 1 and the frame 7.

FIGS. 5a and 5b schematically show how a seat clip 1 is attached to a frame 7 in a cut view. The seat clip 1 may correspond to the seat clip illustrated in FIGS. 1a and 1b. In FIG. 5a, it can be seen that the seat clip 1 is attached to the seat 6. This may correspond to the situation described above with reference to FIG. 3c. In the situation shown in FIG. 5a, the seat clip 1 is not deformed. It is shown that the latching element 5 rests on an outer edge of the wall 17. In this configuration, to attach the seat clip 1 to the frame 7, pressure can be applied in the direction of the indicated arrow. Preferably, this pressure is applied by pushing against a part 15 of the seat clip 1, which may correspond to the substantially flat part 15 of the grip 14 illustrated in FIG. 1a.

Following the application of pressure as indicated, the seat clip 1 is pressed against the frame 7. It can be seen that the curved portion 12 presses against the lower part of the frame 7, which prevents further movement of that part of the seat clip 1 in direction towards the frame. Therefore, the curved portion 11 starts to bend such that its radius of curvature is increased, resulting in an elongation of the seat clip 1 in longitudinal direction. At the same time, the curved portion 12 is deformed such that its radius of curvature is also increased. These deformations cause the lower portion 3 to move in an, in the reference frame of the figure, upward direction, such that the latching element 5 can slide over the wall 17. The latching element 5 will then "snap" into the groove 9. This is inherently accompanied by a sound and/or tactile feedback, which indicates to the user that the latching element 5 has interlocked with the groove 9. When the pressure is removed, the deformed curved element 11 and the deformed curved element 12 will try to resume their non-deformed states. This results in a force that pulls the latching element 5 in a direction opposite to the indicated arrow, and locks it against the wall 17.

The resulting configuration is shown in FIG. 5b. It can be seen that the frontal part of the latching element 5 forms a positive lock with the groove 9, in particular with the wall 17. Once the described procedure has been performed for all seat clips 1 shown in FIG. 4, the seat 6 is fully attached to the frame 7, and the chair is completely assembled.

It is also possible to detach the seat clip 1 from the frame 7 starting from the configuration shown in FIG. 5b by inserting a finger, preferably a thumb, into the opening 16 of the grip 14, and pulling in a direction opposite to the arrow indicated in FIG. 5a. This will again stretch the seat clip 1 along the longitudinal direction and force the latching element 5 over the wall 17.

Although the previously discussed embodiments and examples of the present invention have been described separately, it is to be understood that some or all of the above-described features can also be combined in different ways. The above-discussed embodiments are particularly not intended as limitations, but serve as examples, illustrating features and advantages of the invention.

The invention claimed is:

1. A seat clip for attaching a seat to a frame of a chair, comprising:
   an upper portion arranged to be attached to the seat;
   a lower portion comprising a latching element arranged to be reversibly attached to the frame by positive locking; and
   an intermediate portion connecting the upper portion to the lower portion and being flexible, such that the seat clip can be deformed when pressure is applied to the intermediate portion and/or the lower portion in order to attach the latching element to the frame;
   wherein the seat clip has a substantially S-shape from the upper portion to the lower portion.

2. Seat clip according to claim 1, wherein the latching element comprises a first curved portion.

3. Seat clip according to claim 2, wherein the intermediate portion comprises a second curved portion, which is curved in the same direction as the first curved portion.

4. Seat clip according to claim 1, wherein the upper portion comprises at least one protrusion arranged to be inserted into at least one corresponding opening in the underside of the seat to establish a positive and/or non-positive locking between the seat clip and the seat.

5. Seat clip according to claim 4, wherein a first and a second of at least two protrusions have different outer shapes and/or dimensions.

6. Seat clip according to claim 4, wherein the at least one protrusion comprises a flexible tongue-like element extending laterally from the at least one protrusion.

7. Seat clip according to claim 1, wherein the intermediate portion further comprises a grip arranged for pressing the clip towards the seat and/or the frame when attaching the seat clip to the seat and/or the frame, and for pulling the seat clip away from the seat and/or the frame when detaching the seat clip from the seat and/or the frame.

8. Seat clip according to claim 1, wherein the seat clip is integrally formed.

9. Seat clip according to claim 1, wherein the seat clip is made from a flexible material, in particular a plastic, in particular polyoxymethylene, POM.

10. A chair comprising:
a seat;
a frame; and
at least one seat clip comprising:
an upper portion arranged to be attached to the seat;
a lower portion comprising a latching element arranged to be reversibly attached to the frame by positive locking; and
an intermediate portion connecting the upper portion to the lower portion and being flexible, such that the seat clip can be deformed when pressure is applied to the intermediate portion and/or the lower portion in order to attach the latching element to the frame;
wherein the at least one seat clip is attached via its upper portion to the seat,
wherein the at least one seat clip is attached via its lower portion to the frame by positive locking, and
wherein the at least one seat clip has a substantially S-shape from the upper portion to the lower portion.

11. Chair according to claim 10,
wherein the seat comprises at least one opening;
wherein the upper portion of the at least one seat clip comprises at least one protrusion; and
wherein the at least one seat clip is attached to the seat via positive and/or non-positive locking by inserting the at least one protrusion into the at least one opening.

12. Chair according to claim 10,
wherein the frame comprises a groove; and
wherein the at least one seat clip is attached to the frame by interlocking the latching element with the groove.

13. Chair according to claim 11, wherein the at least one opening is a through-hole or a blind hole.

14. Chair according to claim 11,
wherein the at least one opening comprises at least one notch or groove along its inner wall; and
wherein the at least one protrusion is formed such that it establishes a positive lock with the at least one notch or groove when the upper portion of the seat clip is inserted into the at least one opening.

15. A method of assembling a chair according to claim 10, comprising the steps of:
attaching the at least one seat clip via its upper portion to the seat;
arranging the frame and the seat into a predetermined relative position; and
applying pressure to the intermediate and/or lower portion of the at least one seat clip such that the latching element engages with the frame to provide positive locking.

* * * * *